(12) United States Patent
Zawacki et al.

(10) Patent No.: US 9,594,711 B2
(45) Date of Patent: Mar. 14, 2017

(54) SYSTEMS AND METHODS FOR ACHIEVING CONTINUATION OF EXPERIENCE BETWEEN COMPONENTS IN A HYBRID ENVIRONMENT

(75) Inventors: Jennifer G. Zawacki, Hillsborough, NC (US); Steven R. Perrin, Raleigh, NC (US); Mark C. Davis, Durham, NC (US); Scott E. Kelso, Cary, NC (US); Matthew Roper, Cary, NC (US); Wang Zhe Peng, Beijing (CN); Wang Kai, Beijing (CN); Rong Yang, Beijing (CN); Wang Wen, Beijing (CN)

(73) Assignee: Lenovo (Singapore) Pte. Ltd., Singapore (SG)

( * ) Notice: Subject to any disclaimer, the term of this patent is extended or adjusted under 35 U.S.C. 154(b) by 4 days.

(21) Appl. No.: 12/978,536

(22) Filed: Dec. 24, 2010

(65) Prior Publication Data
US 2012/0166679 A1 Jun. 28, 2012

(51) Int. Cl.
G06F 13/42 (2006.01)
G06F 13/38 (2006.01)
G06F 13/10 (2006.01)

(52) U.S. Cl.
CPC ............ *G06F 13/385* (2013.01); *G06F 13/10* (2013.01)

(58) Field of Classification Search
CPC .............................. G06F 13/10; G06F 13/385
USPC ............................................................ 710/8
See application file for complete search history.

(56) References Cited

U.S. PATENT DOCUMENTS

| | | | | |
|---|---|---|---|---|
| 5,887,193 | A * | 3/1999 | Takahashi | G06F 3/0481 |
| | | | | 348/E5.102 |
| 2004/0124247 | A1* | 7/2004 | Watters | 235/492 |
| 2006/0041893 | A1* | 2/2006 | Castro | H04L 67/02 |
| | | | | 719/320 |
| 2006/0101053 | A1* | 5/2006 | Proctor | 707/102 |
| 2006/0248059 | A1* | 11/2006 | Chi et al. | 707/3 |
| 2009/0198767 | A1* | 8/2009 | Jakobson et al. | 709/203 |
| 2009/0254580 | A1* | 10/2009 | Laurion | 707/102 |
| 2010/0115254 | A1* | 5/2010 | Deng et al. | 713/1 |
| 2011/0112819 | A1* | 5/2011 | Shirai et al. | 703/21 |
| 2012/0173484 | A1* | 7/2012 | Perrin | G06F 17/30174 |
| | | | | 707/621 |

* cited by examiner

*Primary Examiner* — Henry Tsai
*Assistant Examiner* — John Roche
(74) *Attorney, Agent, or Firm* — Ference & Associates LLC

(57) ABSTRACT

Systems and methods described herein provide for a process for managing continuity of experience between operation of a hybrid computer system in the connected state and the slate component independently in the disconnected state. Embodiments further provide for the continuity of experience for devices operating under multiple processors or multiple platforms. According to embodiments, one or more states and conditions of the connected hybrid computer system may be synchronized with the slate component when the slate component is disconnected from the hybrid computer system. Alternatively, embodiments provide for the synchronization of one or more states and conditions of the independent slate component with the hybrid computer system responsive to connecting the slate component to the hybrid computer system. Non-limiting examples of states and conditions according to embodiments are web pages, applications, documents, lists of recently opened files and web pages, and web browser active tabs.

19 Claims, 6 Drawing Sheets

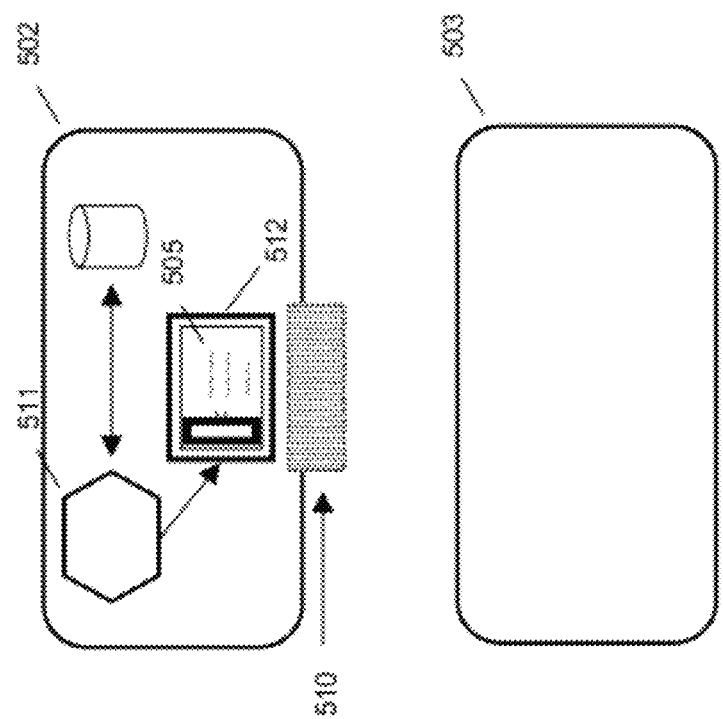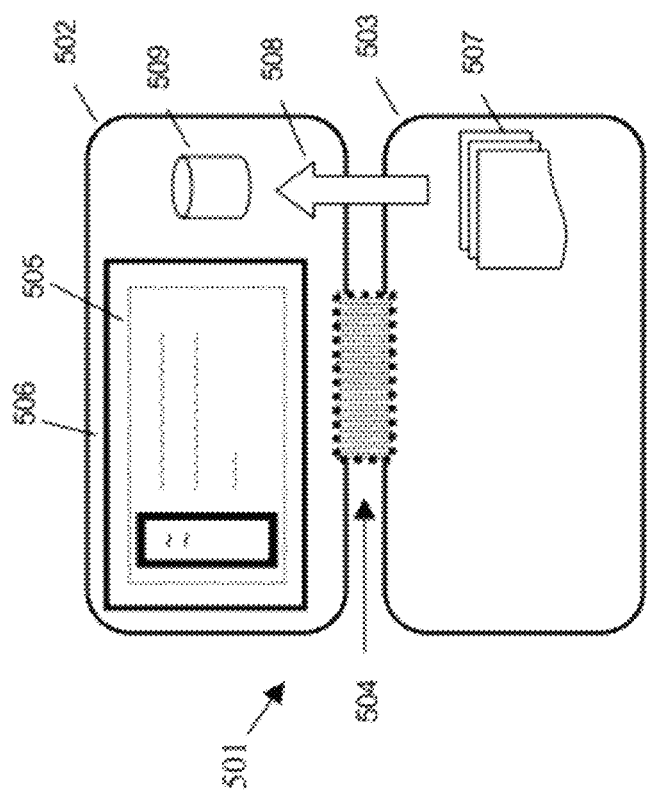
FIG. 5

SYSTEMS AND METHODS FOR ACHIEVING CONTINUATION OF EXPERIENCE BETWEEN COMPONENTS IN A HYBRID ENVIRONMENT

BACKGROUND

The number and diversity of portable electronic devices are proliferating. In addition to established technologies, such as the laptop computer, many new form factors are constantly entering the marketplace, with a limited number eventually becoming popular with users. A recent example of a device whose use is becoming increasingly prevalent is the tablet computer. Although multiple forms exist, tablet computers generally consist of a housing that encompasses the internal computing components, such as processors and data storage devices, and a medium sized display screen (i.e., 7 to 10 inches). Instead of receiving input through the customary keyboard and mouse input devices, tablet devices generally lack these elements and instead provide user interaction through a touch interface on the display that accepts stylus or touch gestures.

Notwithstanding the popularity of new computing device form factors, such as tablet computers, the conventional clamshell laptop computer remains a standard portable computing device for a vast majority of users. An example of a clamshell laptop computer is the IdeaPad® series of personal computers sold by Lenovo (US) Inc. of Morrisville, N.C. IdeaPad® is a trademark of Lenovo, Inc. in the United States, other countries, or both.

Tablet and laptop computers each have their own set of advantages. For example, advantages for tablet computers include mobility and size, while primary reasons for preferring laptop computers include increased processing power and battery life.

BRIEF SUMMARY

In summary, one aspect provides a system comprising: a base device having one or more processors therein, the base device having a first operating system; a display device having one or more processors therein, the display device having a second operating system; one or more communication links between the base device and the display device; and one or more base device synchronization modules, wherein responsive to connecting the display device to the base device, the one or more base device synchronization modules being configured to: observe base device state information on the base device; and transfer the base device state information from the base device to the display device; wherein operation of the display device is synchronized based on the base device state information responsive to disconnecting the display device from the base device.

Another aspect provides a system comprising: a base device having one or more processors therein, the base device having a first operating system; a display device having one or more processors therein, the display device having a second operating system; one or more communication links between the base device and the display device; and one or more display device synchronization modules configured to observe display device state information on the display device responsive to disconnecting the display device from the base device; wherein responsive to connecting the display device to the base device, the display device state information is transferred from the display device to the base device and operation of the base device is synchronized based on the display device state information.

A further aspect provides a method comprising: communicating information through one or more communication links between: a base device having one or more processors and a first operating system; and a display device having one or more processors and a second operating system; utilizing one or more base device synchronization modules, wherein responsive to connecting the display device to the base device, the one or more base device synchronization modules being configured to: observe base device state information on the base device; and transfer the base device state information from the base device to the display device; synchronizing operation of the display device based on the base device state information responsive to disconnecting the display device from the base device.

A still further aspect provides a computer program product comprising: a computer readable storage medium having computer readable program code embodied therewith, the computer readable program code comprising: computer readable program code configured to communicate information through one or more communication links between: a base device having one or more processors and a first operating system; and a display device having one or more processors and a second operating system; computer readable program code configured to utilize one or more base device synchronization modules, wherein responsive to connecting the display device to the base device, the one or more base device synchronization modules being configured to: observe base device state information on the base device; and transfer the base device state information from the base device to the display device; computer readable program code configured to synchronize operation of the display device based on the base device state information responsive to disconnecting the display device from the base device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings.

BRIEF DESCRIPTION OF THE SEVERAL VIEWS OF THE DRAWINGS

FIG. 5 illustrates an example embodiment.

DETAILED DESCRIPTION

Figure 1:
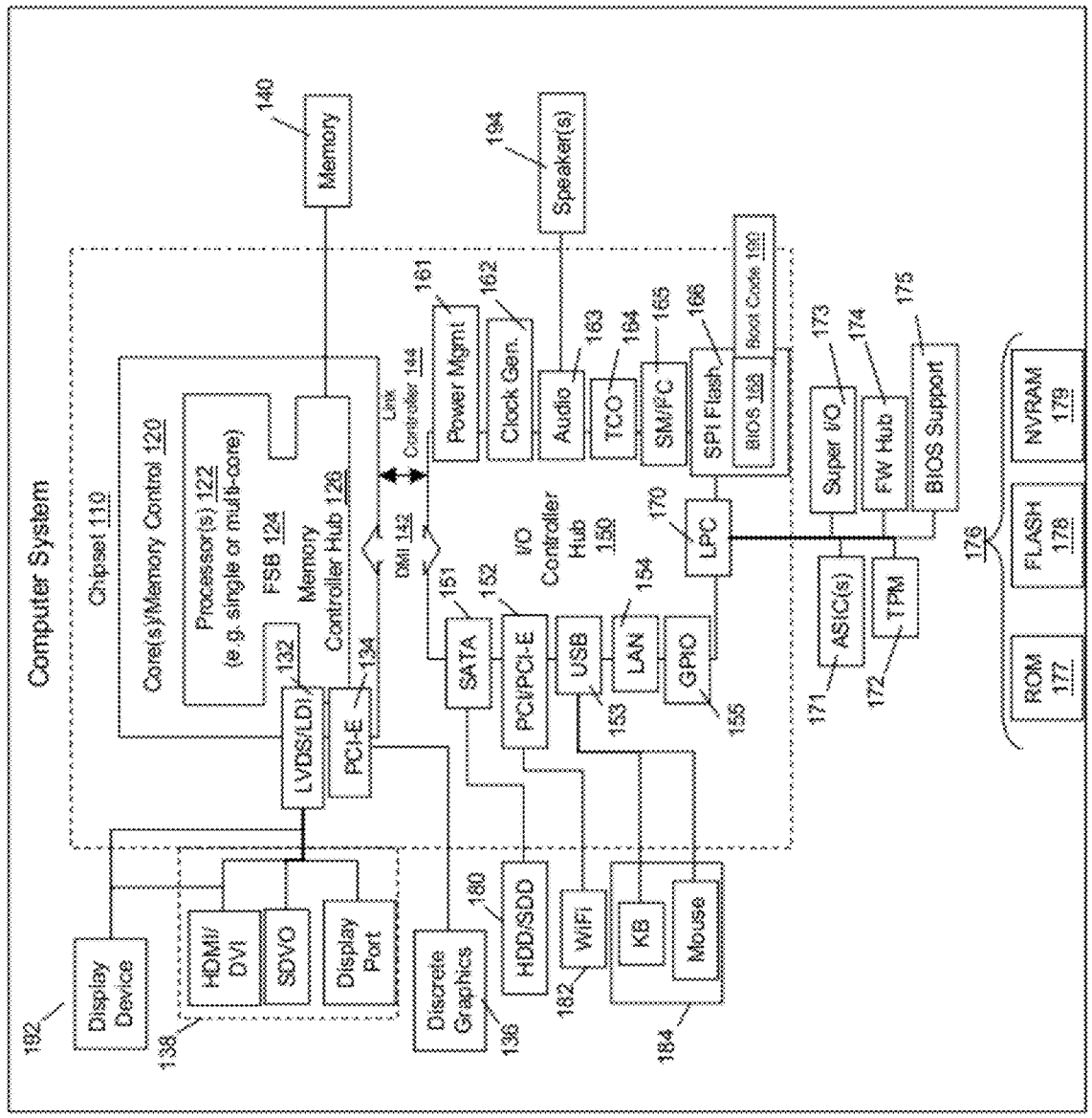
FIG. 1 illustrates an example circuitry of a hybrid computer system.

It will be readily understood that the components of the embodiments, as generally described and illustrated in the figures herein, may be arranged and designed in a wide variety of different configurations in addition to the described embodiments. Thus, the following more detailed description of the example embodiments, as represented in the figures, is not intended to limit the scope of the claims, but is merely representative of those example embodiments.

Reference throughout this specification to "one embodiment" or "an embodiment" (or the like) means that a particular feature, structure, or characteristic described in connection with the example embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation.

Tablet computers and laptop computers are different on many levels. The external structure of a clamshell laptop computer consists of two main components: a lower base and an upper display portion. The lower base is a housing for laptop hardware components, including one or more processors, a motherboard, memory, a keyboard, and pointing device(s). The upper display portion comprises a housing for the laptop display screen and other components, such as a camera, a wireless antenna and the like. The lower base and upper display portion are hingedly connected to allow for opening and closing the laptop computer.

Structurally, tablet or slate computers are generally smaller and more lightweight than laptop computers, consisting only of a single portion of a laptop computer. Tablet computers integrate the display with the typical lower base portion of a laptop computer, usually lack a physical keyboard, and often utilize a touch screen as an input device. In addition, typical tablet computers may be comprised of 7 to 10 inch displays, while the typical laptop computer display is 10 to 17 inches.

In addition to structural and operational differences, tablet and laptop computers also differ with respect to their internal software and hardware configurations. The typical laptop computer form factor houses a Win-Tel platform, comprised of an INTEL x86 compatible processor and is capable of running a Microsoft WINDOWS operating system, such as WINDOWS 7 operating system. In comparison, tablet computers are most likely to run on lower powered processors and lighter weight operating systems specially designed for smaller devices. The lighter weight operating systems are often termed 'mobile operating systems' and are optimized for touch and content consumption instead of running large applications, such as the full version of the Microsoft WORD document processing application. A popular example of a mobile operating system is the ANDROID operating system, which has been used as the operating system for mobile devices such as smartphones, netbooks, and tablet computers. A prominent processor family for these smaller mobile devices, such as a tablet computer, is the ARM series of processors, such as the SNAPDRAGON BY QUALCOMM CPU. WINDOWS 7 is a registered trademark of Microsoft Corp. in the United States and/or other countries. ANDROID is a registered trademark of Google Inc. in the United States and/or other countries. SNAPDRAGON BY QUALCOMM is a registered trademark of Qualcomm Inc. in the United States and/or other countries.

Tablet and laptop computers each have their own set of advantages. Advantages for tablet computers include mobility, size, weight, and increased ease of use for certain functions, such as image manipulation. While primary reasons for preferring laptop computers are increased processing power and battery life, wider choice of operating systems and applications, and the presence of the standard keyboard and touch input devices. As such, it would be advantageous to provide a form factor that includes the functionality and features of both a laptop computer and a tablet computer in one single device.

Embodiments provide for a hybrid computing system consisting of a base device/component operably connected/coupled to a detachable/de-coupled display device/component, wherein the detachable display component includes the functionality of a slate/tablet computing device. According to embodiments, the base component may be comprised of the lower base of a clamshell laptop computing system, additionally having one or more interfaces (such as a connector) for connecting to the display component. Embodiments provide that the display component is comprised of a tablet computing device with one or more complementary interfaces (such as a connector) for connecting to the base component. According to embodiments, the display component may function as the display screen of the hybrid computing system when attached to the base component, and function as an independent tablet computer when not attached to the base component. Embodiments provide that the display component may be hingeably connected with the base component allowing for the opening and closing of the hybrid computing system.

The base component of hybrid computer system and the display component of hybrid computer system comprise various circuitry. While various other circuits or circuitry may be utilized, FIG. 1 depicts a block diagram of one example of a computer system and circuitry. For example, the circuitry depicted in FIG. 1 may be a circuitry included in base component of hybrid computing system, which may correspond to circuitry included in the IDEAPAD series of personal computers sold by Lenovo (US) Inc. of Morrisville, N.C. However, as is apparent from the description herein, components of the embodiments may include other features or only some of the features of the example system illustrated in FIG. 1.

The computer system of FIG. 1 includes a so-called chipset 110 (a group of integrated circuits, or chips, that work together, chipsets) with an architecture that may vary depending on manufacturer (for example, INTEL®, AMD®, ARM® etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory"). The memory controller hub 126 further includes a LVDS interface 132 for a display device 192 (for example, a CRT, a flat panel, a projector, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, et cetera), a PCI-E interface 152 (for example, for wireless connections 182), a USB interface 153 (for example, for input devices 184 such as a digitizer, keyboard, mice, cameras, phones, storage, other connected devices, et cetera.), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

For example, with regard to the display device/tablet circuitry, an example includes an ARM based system (system on a chip) design. Internal busses and the like depend on different vendors, but essentially all the peripheral devices may attach to a single chip. In contrast to the circuitry illustrated in FIG. 1, the tablet circuitry combines the processor, memory control, and I/O controller hub all into a single chip. Also, ARM based systems do not typically use SATA or PCI or LPC. Common interfaces for example include SDIO and I2C. There are power management chips, and in the at least one embodiment, a single chip is used to supply BIOS like functionality and DRAM memory.

Figure 2:
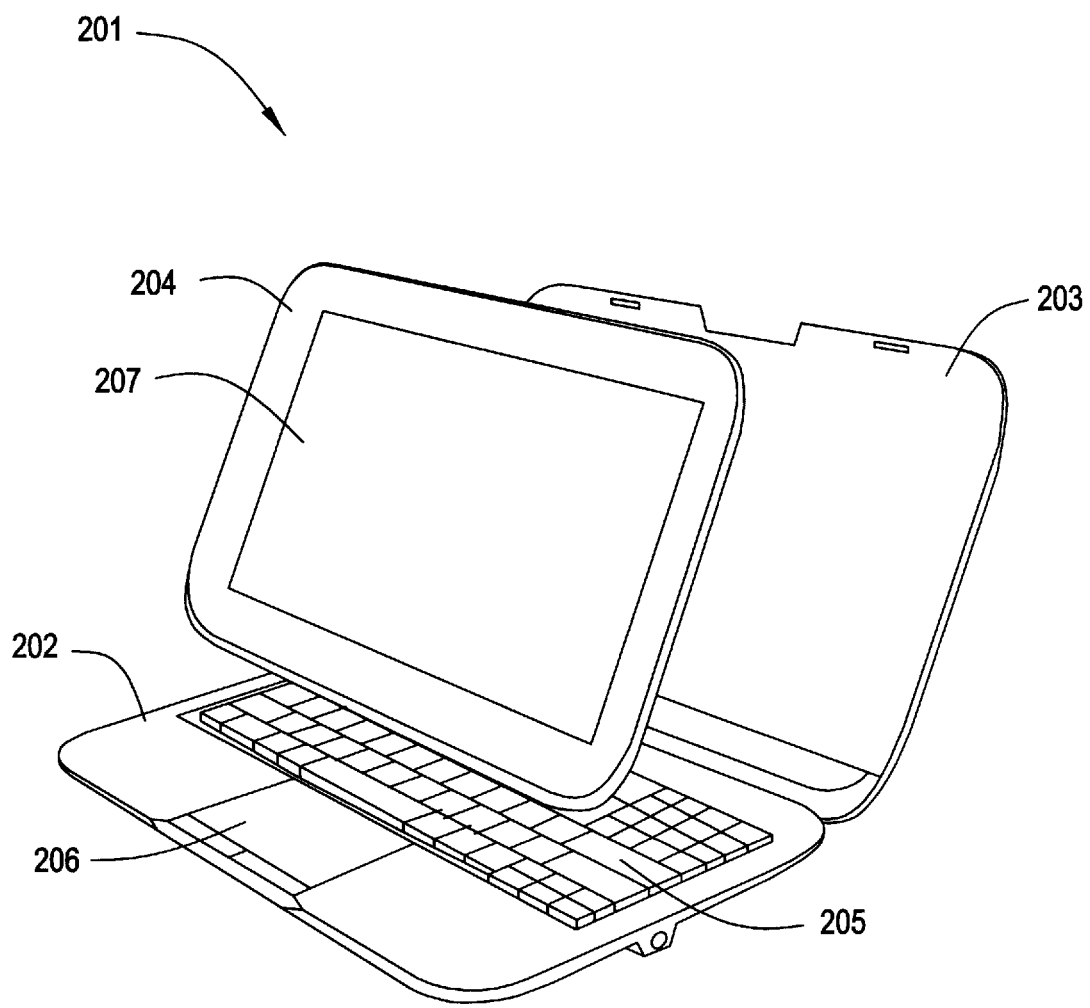
FIG. 2 illustrates an example hybrid computer system.

Referring to FIG. 2, therein is depicted an illustration of a hybrid computing system according to an embodiment. The hybrid computing system 201 includes a base device 202 and a display device/component 204. The base device 202 consists for example of a laptop circuitry such as described in connection with FIG. 1 and optionally a back plate 203 is included for supporting the display device 204 when connected to the base 202. The base device 202 itself has a physical keyboard 205, a touch pad 206, and a base connector element for connecting with the display component connector element. For its part, display device 204 is, for example, a detachable tablet and thus includes a touch screen interface 207, a light weight operating system, one or more processors, and the like.

Figure 3:
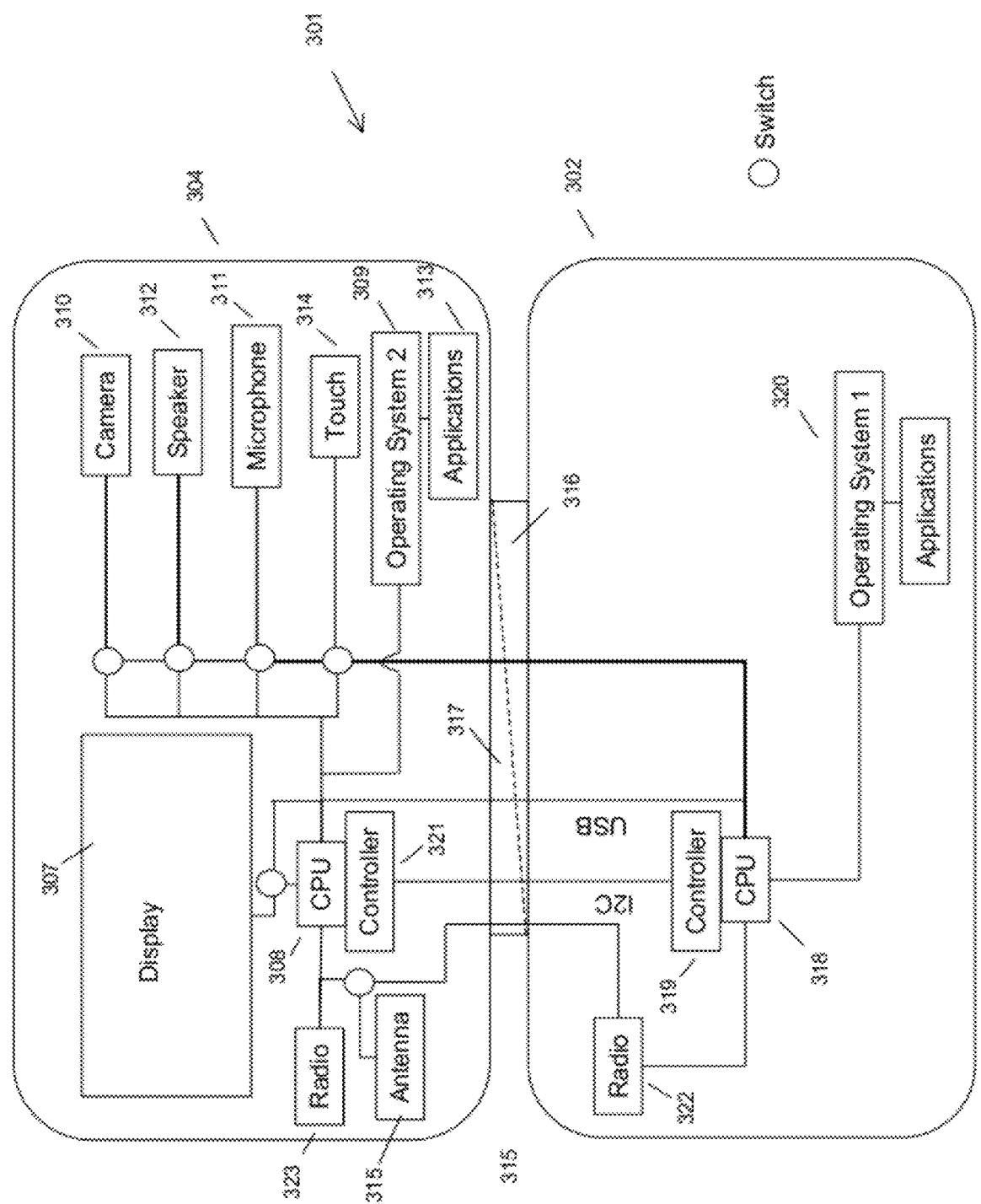
FIG. 3 illustrates an example hybrid computer system.

FIG. 3 provides an illustration of an example embodiment of a hybrid computing system. The hybrid computer system 301 has at least two states. For example, the hybrid computer system includes a connected state when the tablet 304 is connected to the base 302, and a disconnected state when the tablet 304 is not connected to the base 302.

When the hybrid computer system 301 is in the disconnected state, the tablet 304 operates as an independent tablet computer. As such, the tablet CPU 308 and the tablet operating system 309 control the operation of the tablet 304, including the display screen 307, peripherals such as a camera 310, microphone 311, speaker 312, shared wireless antenna 315, accelerometer (not shown), SD card (not shown), other similar peripheral devices, and tablet software applications 313. In the disconnected state, the tablet 304 uses the touch interface module 314 for user interaction through combined display and touch screen, and the shared wireless antenna 315 for network communications.

The hybrid computer system 301 assumes the connected state when the tablet 304 and the base 302 are connected, as for example through their respective connector elements 316, 317. In the example embodiment illustrated in FIG. 3, the connector elements include USB and I2C connections, as well as a power connection for charging tablet 304 battery (not shown) while it is connected to the base 302.

When in the connected state, the tablet and its peripherals are controlled by the base CPU 318, base controller 319, and base operating system 320. Essentially, the tablet 304 becomes a display device for the hybrid computer system 301 similar to the display component of a conventional laptop computer. As such, the tablet CPU 308 and tablet operating system 309 do not control, via controller 321, peripherals, when the hybrid computer system 301 is in the connected state, though the tablet operating system may be running in the connected state.

The base CPU 318, base controller 319, and base operating system 320 control the display screen 307 and any peripherals which may be located in the tablet 304. The base power system (not shown) charges the battery (not shown) located in the base 302 regardless of the connection state of the hybrid computer system 301. However, when the hybrid computer system is in the connected state, the base power system also charges the slate battery via a power connection element, which may be collocated with base connector element 316 and display connector element 317.

In a coupled environment, there are two computing systems, that is a primary system (base device 302), and a secondary system (display device 304 taking the form of a tablet). These systems share access to various peripheral devices and/or internal components, depending on the state (connected or disconnected). Each system is capable of operating independently.

In coordinating the primary and secondary systems in terms of controlling and operating peripheral devices, one function is to ensure adequate communication between the devices. The base device controls the tablet device, including tablet device hardware, software, and peripheral devices, when the hybrid computing system is in the connected state. However, responsive to disconnection, the table acts independently and assumes controls of internal hardware, software, and peripheral devices such that it operates as an independent tablet computing device.

In order to coordinate control and continuity between the primary and secondary system, embodiments provide systems and methods to ensure adequate communication and the transfer of data between the systems. Communication takes place via a connection, which may be physical (wired) or wireless, and communications are exchanged according to one or more communication protocols.

The tablet 304 is a thin device with a display 307 and touch interface 314, with a few other connectors or buttons. A connector 317 on the tablet allows attaching it to the base device dock 316. Switching electronics ("switches" in FIG. 3) in the tablet 304 permit the display 307, touch interface 314, camera 310, microphone 311 and similar peripherals on the tablet 304 to be used by the base device 302 while the tablet 304 is attached. Power from the AC power supply attached to the base device 302 or power from the battery in the base device 302 can be used to charge the battery in the tablet 304.

Communications between the base 302 and the tablet 304 preferably take place at two levels. Control of machine-state, security and other hardware related functions is provided by communications between an embedded controller 318 in the base device 302 and controller 321 on the tablet 304. This communication link may use protocols like I2C or LPC. At a second level, higher bandwidth communications between the CPU 318 in the base device 302 and the CPU 308 in the tablet 304 can be used to move large amounts of data, such as video files. This link may use methods like USB, PCI express or Ethernet.

The connector 316, 317 between the tablet 302 and base 304 thus may include power connection, low speed communications, and high speed communications for data and peripheral devices. The connector 316, 317, along with other mechanical strengthening components such as a back plate 203 or socket support the tablet 302 when attached and allow operation as a clamshell type computer.

Figure 4:
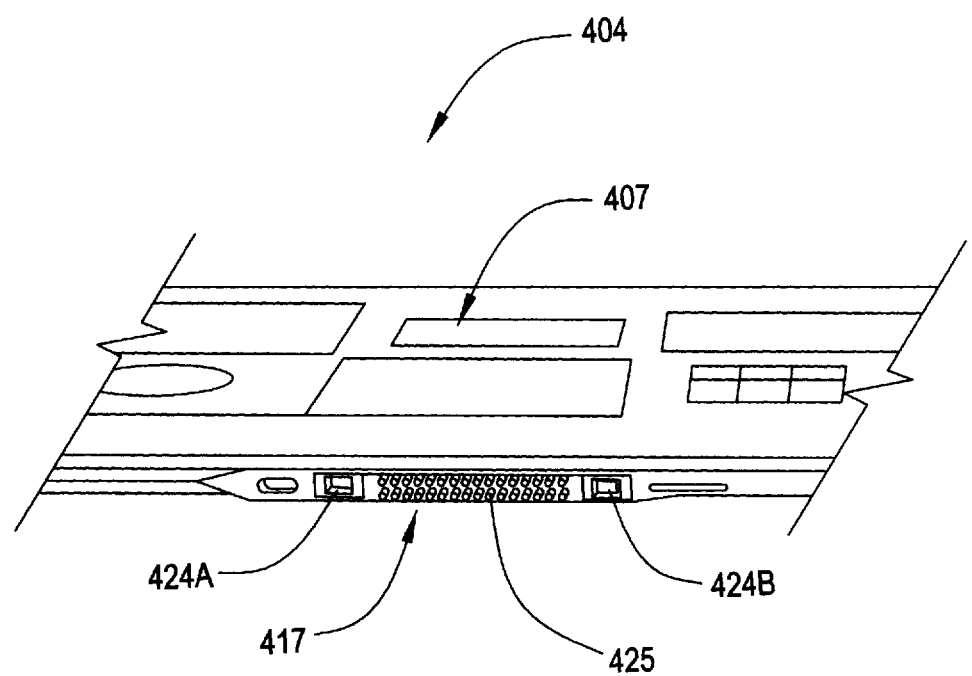
FIG. 4 illustrates an example connection on display device.

FIG. 4 illustrates an example connector element 417 on display device (tablet) 404. Tablet 404 includes a physical connector element 417 that includes inlets 424A, 424B for permitting insertion of mechanical strengthening components on complementary connector element of the base device. Furthermore, connector element 417 includes electrical connection portion 425 that supports communication links, for example between controllers of base device and tablet 404, as well as power connection(s), such as for charging battery of tablet 404. Tablet in disconnected state operates independently, including combined display/touch screen interface 407.

According to current technology, when transitioning between devices, or between embedded systems in a single device, a user must re-open any files, web pages, or documents that had been open on the alternative system. This may additionally involve actively copying files between devices. However, a hybrid computing system user would greatly benefit from a continuity of experience between operating the hybrid computer system in the connected state and operating the slate component independently in the disconnected state. In addition, any benefit would be extended if the continuity of experience could be achieved without relying on a complexity of multiple synchronization mechanisms. As such, it would be advantageous to provide continuity of experience seamlessly managed through a single process.

Embodiments provide for a process for managing continuity of experience between operation of a hybrid computer system in the connected state and the slate component independently in the disconnected state. According to embodiments, one or more states and conditions of the connected hybrid computer system may be synchronized with the slate component when the slate component is disconnected from the hybrid computer system. Alternatively, embodiments provide for the synchronization of one or more states and conditions of the independent slate component with the hybrid computer system responsive to connecting the slate component to the hybrid computer system. Embodiments provide that whether the hybrid computing system operates according to the base component state information or synchronization with the display device may be determined based on settings, including, but not limited to, system settings, user preferences, or user responses to system prompts. Non-limiting examples of states and conditions according to embodiments are web pages, applications, documents, lists of recently opened files and web pages, and web browser active tabs.

Referring now FIG. 5, therein is depicted an example embodiment of synchronizing a slate component after being disconnected from the base component of a hybrid computing system. When in the connected state 504, the display component 502 is controlled by the base component 503 of the hybrid computing system 501. In FIG. 5, the display component 502 is displaying a web page 505 opened in a web browser 506 running on the base component 503. State information 507 pertaining to the base component 503 is transmitted 508 to the display component 502 and stored in a database 509. Responsive to the display component being disconnected 510 from the base component, a synchronization module 511 on the display component 502 interacts with the database 509 to determine which state information 507 may be synchronized on the display component 502. The synchronization module determines that the web page 505 may be opened in the display device web browser 512.

In the example embodiment depicted in FIG. 5, the state information is being transferred to the slate component for use by the slate component when disconnected from the hybrid computing system. Embodiments provide that state information may also be transferred from the slate component to the base component for use when the hybrid computing system is in the connected state. As a non-limiting example, a web page active on the slate component operating independently may be opened in a web browser running on the base component responsive to the slate component being connected to the base component. Embodiments provide that state information may be harvested from each component and stored in one or more database structures on only one component, both, or none. As such, embodiments provide that state information pertaining to the base component may be transferred to the display component and stored in a database on the display component, and state information pertaining to the display component may be transferred to the base component and stored in a database on the base component. Another non-limiting example provides that a database structure of base component state information may be maintained on the slate component only or on both the base and slate components.

Embodiments provide that the state information may be transferred based on a query, an event, or based on user command. As a non-limiting example, a full scan of state information may be performed responsive to the hybrid computing system entering or exiting the connected state. According to embodiments, state information transferred based on a query or event may be used in combination with state information stored in a database, instead of database information, or some combination thereof.

According to embodiments, data may be transferred between hybrid computing system components in addition to state information. Embodiments provide that data may include, but is not limited to, files, documents, application settings, and associated metadata. Embodiments may initiate the transfer of data and state information using multiple methods, including, but not limited to, polling for changes, at pre-determined time intervals, responsive to file save and open events, and according to recent file retention settings, such as recent file and web site lists maintained by software applications, browsers, and operating systems. As a non-limiting example, responsive to a file being added to a recent file history list on the base component, such as the most recently used (MRU) system in the WINDOWS 7 operating system, the file and associated information may be pushed across to the slate component.

Different operating system platforms use different applications for opening documents. For example, the WINDOWS 7 operating system and ANDROID operating system each use different applications for opening the same types of media files (e.g., MP3 files). Embodiments provide methods and systems for mapping applications on one component to applications on the other component. A non-limiting example provides that the hybrid computing system in the connected state may be operating under the WINDOWS 7 operating system such that documents with the .doc extension are opened in the MICROSOFT WORD word processing application. The slate computer in the independent state may be running the ANDROID operating system and may open .doc documents using a corresponding QUICKOFFICE application running on the slate computer such that the document may be opened in the QUICKWORD word processing application.

Accordingly, embodiments provide for the mapping of applications between components and operating platforms. Certain embodiments provide for the direct mapping of one or more applications, wherein a structure is maintained for mapping particular applications available in one operating environment with particular applications available in a different operating environment. As indicated above, a non-limiting example involves mapping the MICROSOFT WORD word processing application available in a WINDOWS operating environment with the QUICKWORD word processing application available in an ANDROID operating environment.

Embodiments also provide for the indirect mapping of applications using file information, such as metadata. A non-limiting example involves metadata consisting of file descriptors that describe the content of the files, such as the MIME type. According to this non-limiting example, a file with a MIME/audio type may be opened by the appropriate application for handling audio files in the particular operating environment, such as WINDOWS MEDIA PLAYER in a WINDOWS operating environment. Embodiments provide that a mapping table may be maintained that contains information regarding which file types are consumed by which applications in a particular operating environment.

When shifting between operating environments, devices according to current technology may be overwhelmed if required to open all of the applications and files that were active on a coupled device. For example, if the hybrid computing device had seven applications and ten documents open at the time the slate component was disconnected, the slate component operating system may experience processing and memory bottlenecks when attempting to open all of the applications and documents. In addition, problems may occur when mapping unknown document types. Embodiments provide processes and methods for selectively opening applications and documents when synchronized an operating environment.

Embodiments may not launch applications when switching to a new operating environment, rather, when a user opens an application, the new operating environment attempts to open the documents that were open in the corresponding application in the previous operating environment. As a non-limiting example, a file of extension type .pdf is open in the hybrid computing system in the connected state. When the slate computer is disconnected from the hybrid computing system, the same .pdf file may be opened by launching the application on the slate computing system that handles .pdf files.

Figure 6:
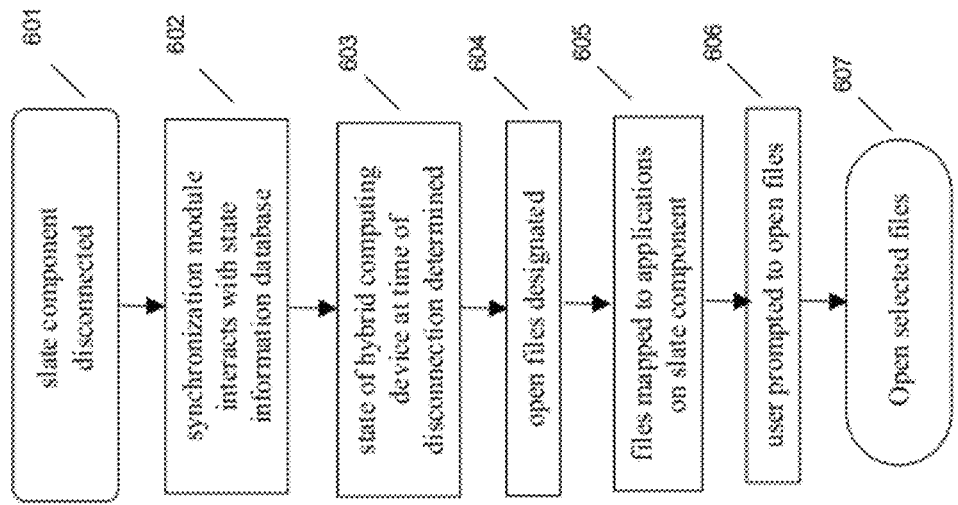
FIG. 6 illustrates a flow diagram of an example embodiment.

According to embodiments, documents may be opened responsive to user responses to prompts provided by the new operating environment. Referring now to FIG. 6, therein is depicted a flow diagram of an example of such a process according to an embodiment. The slate component detects detachment from the hybrid computing system 601. The synchronization module interacts with the state information database 602 to ascertain the state of the hybrid computing system at the time the slate component was disconnected 603. The synchronization module determines which files were open on the hybrid computing system 604. A mapping module maps the files to applications on the slate component 605. A prompt is generated asking the user whether to open one, none, all, or some combination thereof, of the files 606. Subsequently, the files are opened in their respective applications on the slate component if selected 607.

Embodiments may also be arranged to map applications in one component operating environment to the other component operating environment. As a non-limiting example, the base component may be running the WINDOWS 7 operating system and have a document open in the MICROSOFT WORD word processing application while the hybrid computing system is in a connected state. When the slate computer, which is running the ANDROID operating system, is disconnected from the hybrid computing system, the MICROSOFT WORD word processing application may be mapped to the corresponding QUICKOFFICE document processing application running on the slate computer such that the document may be opened in the corresponding QUICKWORD word processing application available on the slate component.

Embodiments further provide for a base component comprising multiple processors capable of supporting different platforms. One such embodiment comprises a first and a second processor, wherein the first processor supports a Win-Tel platform while the second processor supports a mobile operating system. As a non-limiting example, the Win-Tel platform may be comprised of an INTEL x86 compatible processor capable of supporting the Microsoft WINDOWS operating system, such as the WINDOWS 7 operating system, while the mobile operating system platform may support the ANDROID operating system. In this embodiment, a method is provided for switching between operating the hybrid computing device in the connected state using the first processor or the second processor of the base component, each operating under its associated platform.

Accordingly, continuity of experience as described in embodiments herein may be achieved when switching between processors. Thus, synchronization of state information according to embodiments may be invoked responsive to switching between base component processors when the hybrid computing device is in the connected state. In addition, when the hybrid computing device is configured according to this embodiment, a database structure pertaining to each processor may be maintained across components and between operating platforms within components.

Embodiments manage continuity of experience between operation of one or more computing devices in one or more computing environments. Embodiments include managing continuity between operating a hybrid computer system in the connected state and the slate component independently in the disconnected state. Certain embodiments manage continuity between a computing device operating under one or more processors and the platforms supported by each of the one or more processors. As a non-limiting example, a hybrid computing device may include a base component with a method for switching between operating using an INTEL x86 processor under the WINDOWS 7 operating system and operating using an ARM processor under the ANDROID operating system in the same base component.

According to embodiments, one or more states and conditions of the connected hybrid computer system may be synchronized with the slate component responsive to the slate component being disconnected from the hybrid computer system. Alternatively, embodiments provide for the synchronization of one or more states and conditions of the independent slate component with the hybrid computer system responsive to connecting the slate component to the hybrid computer system. Embodiments further provide for continuity of experience and synchronization according to embodiments described herein between any devices capable of achieving communication, including, but not limited to, Ethernet, USB, Wi-Fi, and over the Internet. As such, a non-limiting example provides that a first device may be synchronized according to embodiments described herein with one or more devices connected through the Internet.

It should be understood that many of the functional characteristics of the embodiments described in this specification may be implemented as modules. Modules may include hardware circuits such as one or more processors with memory, programmable logic, and/or discrete components. The hardware circuits may perform hardwired logic functions, execute computer readable programs stored on non-signal storage devices, and/or execute programmed functions. The computer readable programs may in combination with other elements perform the functions of the embodiments.

It will be readily understood by those having ordinary skill in the art that embodiments may take the form of an entirely hardware embodiment or an embodiment containing both hardware and software elements. An embodiment that is implemented in software may include, but is not limited to, firmware, resident software, microcode, etc.

The computer readable programs may be stored any non-signal medium. Examples of a non-signal medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Accordingly, elements may be implemented on at least one electronic device running suitable software programs. These may also be implemented on at least one Integrated Circuit or part of at least one Integrated Circuit. Thus, it is to be understood that the embodiments may be implemented in a combination of both hardware software. Again, computer/machine-readable programs may in combination with an electronic device perform the functions of the embodiments.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

In the drawings and specification there has been set forth example embodiments and, although specific terms are used, the description thus given uses terminology in a generic and descriptive sense only and not for purposes of limitation.

What is claimed is:

1. A system comprising:
a base device having one or more processors therein, the base device having a first operating system;
a display device having one or more processors therein, the display device having a second operating system;
one or more communication links between the base device and the display device; and
one or more base device synchronization modules, wherein responsive to connecting the display device to the base device, the one or more base device synchronization modules;
observe base device state information on the base device; and
transfer the base device state information from the base device to the display device, wherein the base device state information comprises one or more listings of recently opened web pages opened in a web browser of the base device and web browser active tabs;
wherein a web browser is activated on the display device and is synchronized based on the base device state information comprising the web browser active tabs responsive to disconnecting the display device from the base device; and
wherein the display device web browser opens one or more web pages indicated by the web browser active tabs.

2. The system according to claim 1, further comprising:
one or more display device synchronization modules configured to observe display device state information on the display device responsive to disconnecting the display device from the base device;
wherein responsive to connecting the display device to the base device, the display device state information is transferred from the display device to the base device and operation of the base device is synchronized based on the display device state information.

3. The system according to claim 1, wherein the display device is a tablet computer.

4. The system according to claim 1, wherein the base device state information comprises one or more listings of recently opened files, and one or more files.

5. The system according to claim 1, wherein the base device state information is stored in one or more database structures on the display device.

6. The system according to claim 1, further comprising:
a third operating system on the base device, the base device being configured to switch operation between the first operating system and the third operating system;
wherein the one or more base device synchronization modules transfer the first operating system state information from the first operating system to the third operating system, and transfer the third operating system state information from the third operating system to the first operating system;
wherein operation of the first operating system is synchronized based on the third operating system state information responsive to switching base device operation from the third operating system to the first operating system; and
wherein operation of the third operating system is synchronized based on the first operating system state information responsive to switching base device operation from the first operating system to the third operating system.

7. The system according to claim 4, wherein synchronizing operation of the display device further comprises:
a display device web browser configured to open web pages on the display device;
wherein the display device web browser opens web pages listed in the one or more listings of recently opened web pages.

8. The system according to claim 4, wherein synchronizing operation of the display device further comprises:
one or more display device applications configured to open files and web pages on the display device;
wherein the display device generates a map relating files and web pages listed in the state information to one or more corresponding display device applications.

9. The system according to claim 8, further comprising:
wherein responsive to activation of one or more selection criteria, the one or more display applications open files and web pages listed in the base device state information based on the map; and
wherein the one or more selection criteria are comprised of one or more user prompts and launching of the one or more applications.

10. The system according to claim 8, wherein the map comprises one or more application tables configured to maintain relationships between one or more display device applications and one or more base device applications.

11. A method comprising:
communicating information through one or more communication links between: a base device having one or more processors and a first operating system; and a display device having one or more processors and a second operating system;
utilizing one or more base device synchronization modules, wherein responsive to connecting the display device to the base device, the one or more base device synchronization modules:
observe base device state information on the base device; and
transfer the base device state information from the base device to the display device, wherein the base device state information comprises one or more listings of recently opened web pages opened in a web browser of the base device and web browser active tabs; and
activating and synchronizing operation of a web browser on the display device based on the base device state information comprising the web browser active tabs responsive to disconnecting the display device from the base device;
wherein the display device web browser opens one or more web pages indicated by the web browser active tabs.

12. The method according to claim 11, further comprising:
configuring one or more display device synchronization modules to observe display device state information on the display device responsive to disconnecting the display device from the base device; and
synchronizing operation of the base device based on the display device state information transferred from the display device to the base device responsive to connecting the display device to the base device.

13. The method according to claim 11, wherein the base device state information comprises one or more listings of recently opened files, and one or more files.

14. The method according to claim 11, wherein the base device state information is stored in one or more database structures on the display device.

15. The method according to claim 11, further comprising:
configuring the base device to switch operation between the first operating system and a third operating system;
transferring the first operating system state information from the first operating system to the third operating system and the third operating system state information from the third operating system to the first operating system;
synchronizing operation of the first operating system based on the third operating system state information responsive to switching base device operation from the third operating system to the first operating system; and
synchronizing operation of the third operating system based on the first operating system state information responsive to switching base device operation from the first operating system to the third operating system.

16. The method according to claim 13, wherein synchronizing operation of the display device further comprises:
configuring one or more display device applications to open files and web pages on the display device; and
generating a map relating files and web pages listed in the state information to one or more corresponding display device applications.

17. The method according to claim 16, further comprising:
opening files and web pages listed in the base device state information based on the map responsive to activation of one or more selection criteria, the one or more selection criteria being comprised of one or more user prompts and launching of the one or more applications.

18. The method according to claim 16, wherein the map comprises one or more application tables configured to maintain relationships between one or more display device applications and one or more base device applications.

19. A computer program product comprising:
a computer readable storage medium having computer readable program code embodied therewith, the computer readable program code comprising:
computer readable program code that communicates information through one or more communication links between: a base device having one or more processors and a first operating system; and a display device having one or more processors and a second operating system;
computer readable program code that utilizes one or more base device synchronization modules, wherein responsive to connecting the display device to the base device, the one or more base device synchronization modules:
observing base device state information on the base device; and
transferring the base device state information from the base device to the display device, wherein the base device state information comprises one or more listings of recently opened web pages opened in a web browser of the base device and web browser active tabs; and
computer readable program code configured to activate and synchronize operation of a web browser on the display device based on the base device state information comprising the web browser active tabs responsive to disconnecting the display device from the base device;
wherein the display device web browser opens one or more web pages indicated by the web browser active tabs.

* * * * *